United States Patent [19]

Marchigiano

[11] Patent Number: 4,842,568
[45] Date of Patent: Jun. 27, 1989

[54] REAR DERAILLEUR FOR BICYCLE GEARS

[75] Inventor: Giorgio Marchigiano, Torino, Italy

[73] Assignee: Marelmo S.n.c., Torino, Italy

[21] Appl. No.: 223,043

[22] Filed: Jul. 22, 1988

[30] Foreign Application Priority Data

Jul. 24, 1987 [IT] Italy ................................. 67646 A/87
Feb. 15, 1988 [IT] Italy ................................. 67110 A/88

[51] Int. Cl.$^4$ ........................................... F16H 11/08
[52] U.S. Cl. ..................................................... 474/80
[58] Field of Search ..................................... 474/77–82

[56] References Cited

U.S. PATENT DOCUMENTS 4,504,250 3/1985 Juy .......................................... 474/80
4,637,808 1/1987 Nakamura ............................. 474/80

Primary Examiner—Thuy M. Bui
Attorney, Agent, or Firm—Sughrue, Mion, Zinn, Macpeak & Seas

[57] ABSTRACT

A rear derailleur for bicycle gears, which is adapted to derail the bicycle chain on a series of sprockets of increasing diameter carried by the rear hub of the bicycle, comprises a support body for mounting on the bicycle frame and a rocker arm carrying idler wheels for the chain. The rocker arm is mounted on the support body for sliding movement along an axis parallel to the axis of the rear hub of the bicycle and is pivotable about that axis relative to the support body. An auxiliary member fixed to the bicycle frame supports the body for pivoting about an axis parallel to the axis of the hub.

6 Claims, 4 Drawing Sheets

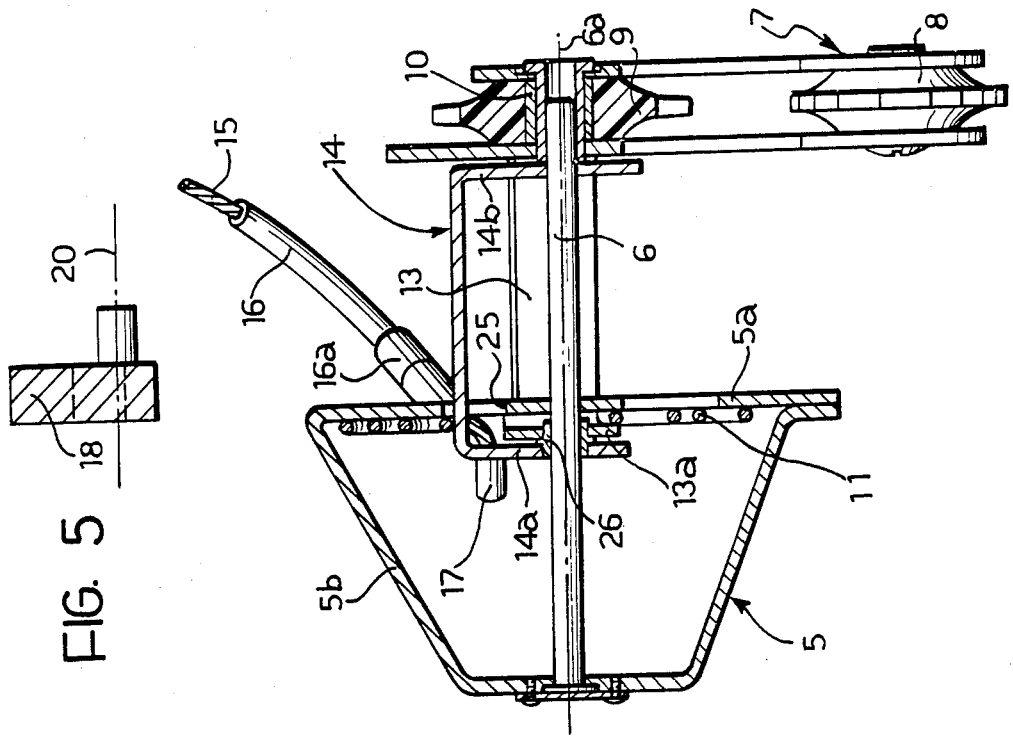
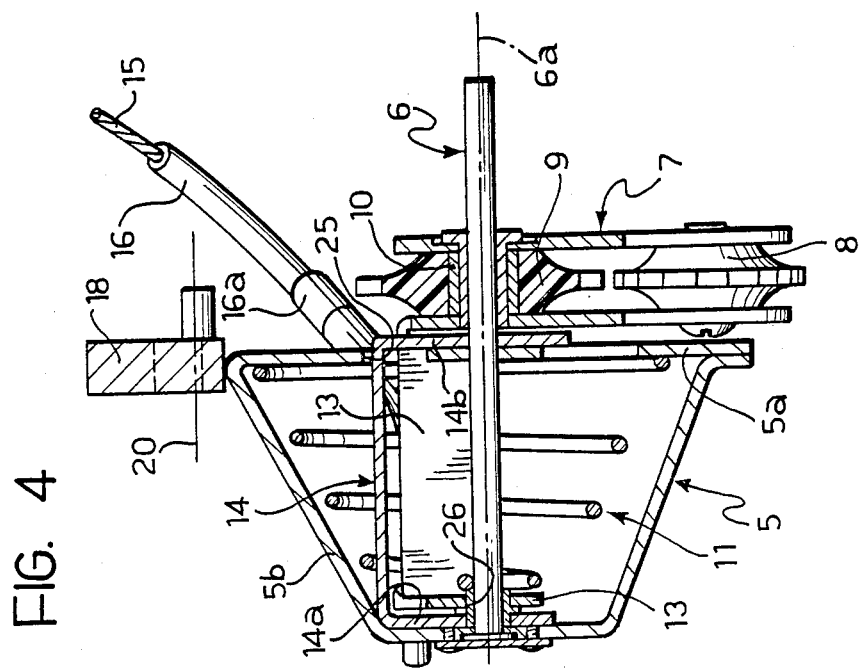

REAR DERAILLEUR FOR BICYCLE GEARS

BACKGROUND OF THE INVENTION

The present invention relates to a rear derailleur for bicycle gears, which is adapted to derail the bicycle chain on to a series of sprockets of increasing diameter carried by the rear hub of the bicycle. The invention concerns, in particular, a rear derailleur of the type comprising:

a support body for connection to the bicycle frame, a rocker arm which carries idler wheels for the chain and which is mounted on the support body for sliding movement along an axis parallel to the axis of the rear hub of the bicycle between a first end position in which the chain is engaged with the smallest-diameter sprocket and a second end position in which the chain is engaged with the largest-diameter sprocket, the rocker arm being pivotable about the axis parallel to the axis of the rear hub of the bicycle, resilient means for urging the rocker arm towards the first position and for urging the rocker arm to pivot about the axis in the sense corresponding to the tensioning of the chain, and means for moving the rocker arm towards the second position. A derailleur of this type, described in French Pat. No. FR-575,191 has the disadvantage that it can be used to advantage only on bicycles of an age which are provided with no more than three sprockets keyed to the rear hub, corresponding to three different speed ratios. The example described in the above French patent does not enable the chain to be derailed on to the idler wheels of modern touring or racing bicycles with seven sprockets, since the spring with which the derailleur is provided, by becoming packed, does not allow the rocker arm to travel a sufficient distance. It might be possible to increase the travel of the cylindrical spring but this would require the use of a rocker arm of excessive width which would project too much from the bicycle. Moreover, the pivoting of the rocker arm is not sufficient to take up the portion of the chain which becomes free when the chain moves from the smallest sprocket or ring to those with greater numbers of teeth.

SUMMARY OF THE INVENTION

The object of the present invention is to produce a rear derailleur for bicycle gears of the type specified at the beginning of the description, which can be used on modern bicycles and which has a simple structure, a small weight and which is less expensive than classical articulated-parallelogram derailleurs.

In order to achieve this object, the invention provides a derailleur of the type indicated at the beginning of the present description, characterised in that the support body is connected to the bicycle frame with the interposition of an auxiliary member which is fixed to the frame and which supports the body for pivoting about a further axis parallel to the axis of the rear hub of bicycle and displaced forwardly of the rear-hub axis of the bicycle, the device also including auxiliary resilient means interposed between the support body and the auxiliary member for urging the support body towards a position in which the idler wheels are nearest to the sprockets, the unit constituted by the support body and the rocker arm, however, being made to pivot relative to the auxiliary member—towards a position in which the idler wheels are further from the sprockets—by the greater pull exerted on the rocker arm by the bicycle chain when the latter is derailed onto larger-diameter sprockets.

By virtue of these characteristics, it is possible to ensure that the derailleur functions safely and reliably and the minimum force is needed to operate it. In fact, when the chain is derailed on to the larger-diameter sprockets, the chain return wheels are spaced further from the sprockets, thus ensuring that the derailleur operates more correctly and regularly.

The resilient means are preferably constituted by a conical helical spring working under torsion and under compression, which, by virtue of its shape, enables the entire transverse travel of the derailleur to be used without problems of packing of the spring itself.

BRIEF DESCRIPTION OF THE DRAWINGS

The invention will now be described with reference to the appended drawings, provided purely by way of non-limiting example, in which:

FIG. 4 is a section taken on the line IV—IV of FIG. 1, and FIG. 5 is a section taken on the line V—V of FIG. 2.

DETAILED DESCRIPTION OF THE INVENTION

Figure 1:
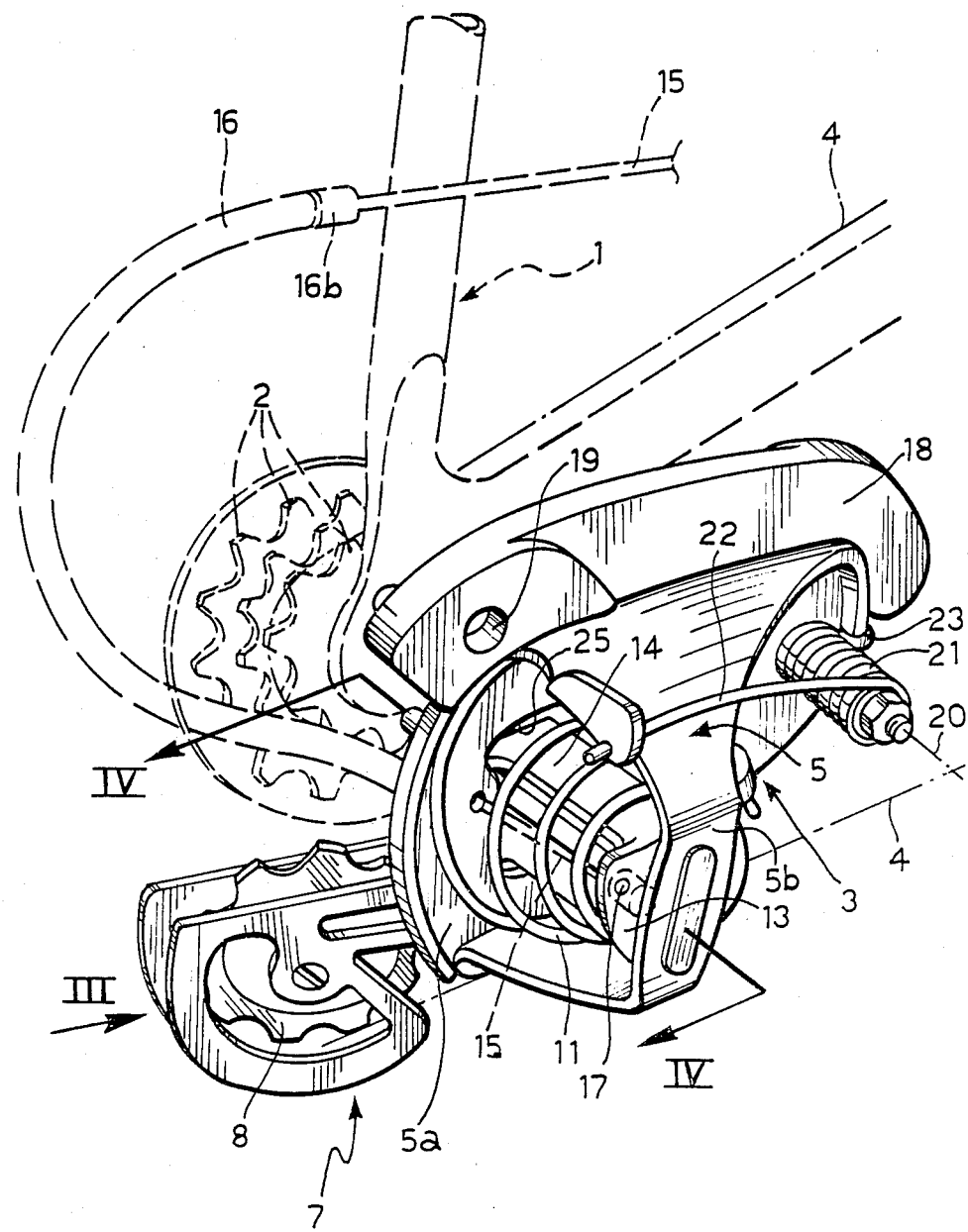
FIG. 1 is a perspective view which shows the device according to the invention in the condition in which it is mounted on the bicycle and in the position in which the chain is engaged with the smallest-diameter sprocket.
Figure 2:
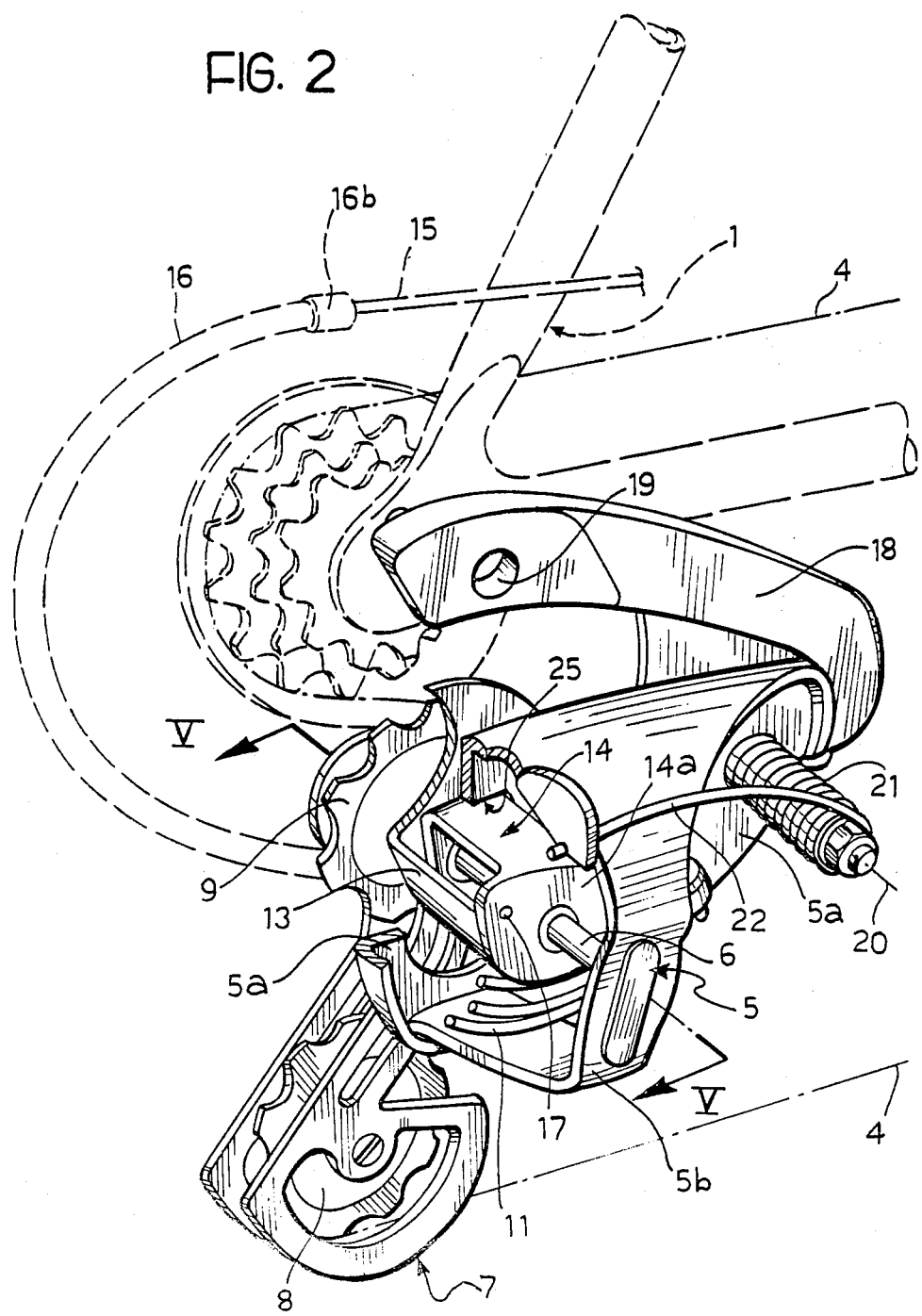
FIG. 2 is a variant of FIG. 1, showing the device in the position in which the chain is engaged with the largest-diameter sprocket, FIG. 3 a view taken on the arrow III of FIG. 1.
Figure 3:
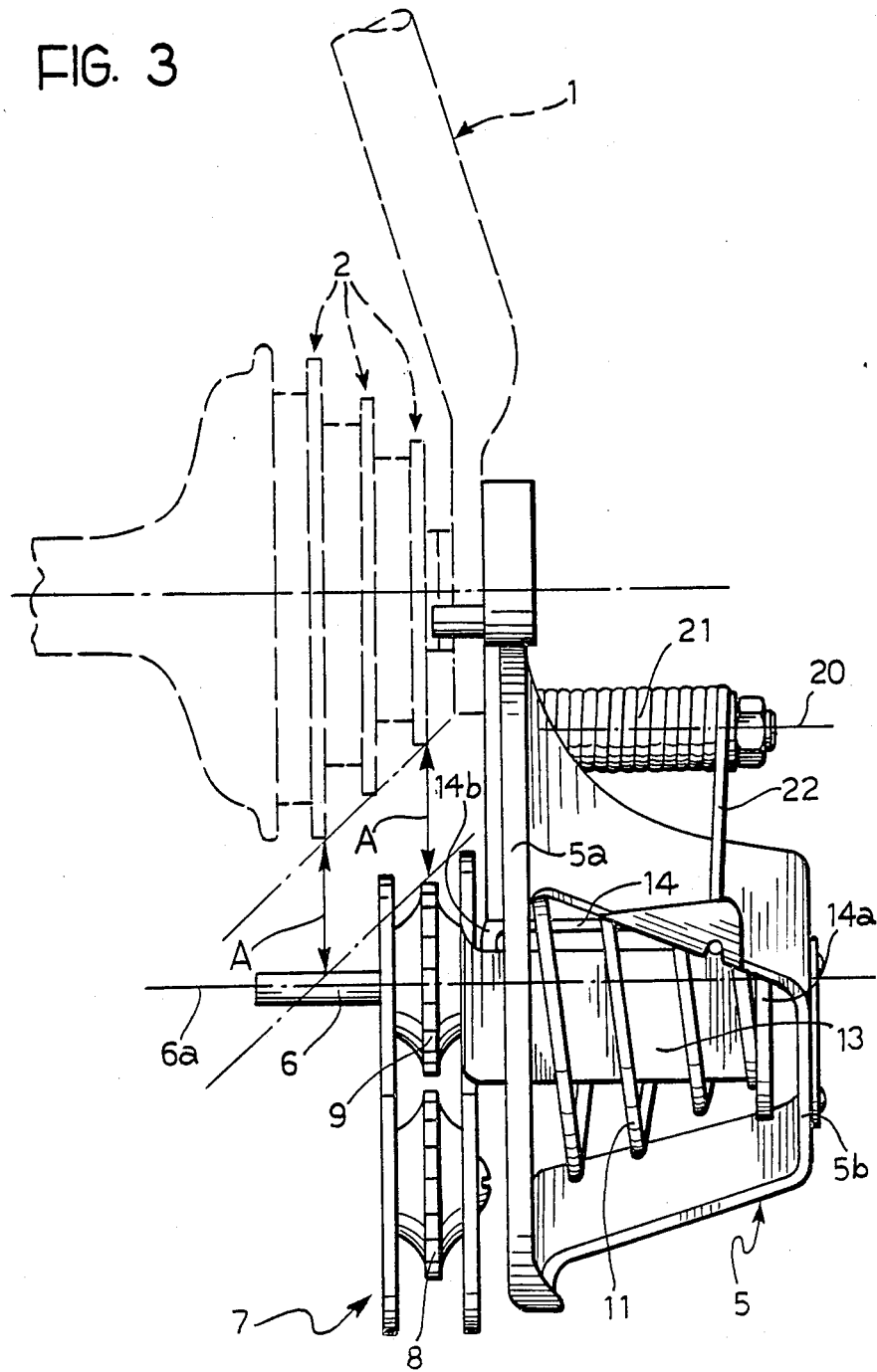

In FIGS. 1–3, the elements of the bicycle which do not form part of the device according to the invention are shown on broken outline. With reference to these drawings, the part of the bicycle frame adjacent the hub of the rear wheels is indicated 1 and on it is mounted a series of sprockets 2 of increasing diameter. For greater clarity of the drawings, a series of only three sprockets is shown, but it is understood that the derailleur according to the invention functions perfectly with seven sprockets (for example, with sprockets having from 12 to 32 teeth). The derailleur device according to the invention is generally indicated 3 and serves to derail the bicycle chain (illustrated only schematically and in broken outline at 4) on to the series of sprockets 2.

The device 3 includes a support body 5 constituted, for example, by a metal cage having a base plate 5a and a C-shaped bridge part 5b connected at its ends to the base plate 5a. A cylindrical guide pin 6 is fixed to the latter and to a central region of the C-shaped part 5b with its axis 6a parallel to the axis of the rear hub of the bicycle when the device is in the mounted condition. The usual rocker arm is indicated 7 and carries two idler return wheels 8, 9 for the chain. The structural details of the rocker arm 7, which can be seen in the drawings, are not described in detail, since they are of known type and, in any case, do not fall within the scope of the present invention.

The rocker arm 7 is mounted for sliding movement on the cylindrical guide pin 6 with the interposition of a bush 10, coaxial with the idler wheel 9, and is also mounted for pivoting on the pin 6 about the axis 6a. The rocker arm 7 also has a lateral guide arm 13 which passes through a shaped aperture 25 in the base plate 5a and is provided with an end 13a which is bent into an L-shape and provided with a bush 26 which is slidable on the pin 6.

The derailleur also includes a conical helical spring 11 interposed between the base plate 5a and the C-shaped portion 5b and intended to work both under torsion and under compression. The larger-diameter end of the spring 11 is connected to the base plate 5a of the support body 5. The opposite end of the spring 11 is connected to an end wall 14a of a slider 14 which is slidable on the pin 6 but is prevented from rotating on the pin by a prismatic coupling with the shaped aperture 25 in the base plate 5a, and by the pull of the control cable 15 described below. The end wall 14a of the slider 14 is slidable on the pin 6 and is interposed between the C-shaped portion 5b of the support body 5 and the end 13a of the guide arm 13 of the rocker arm 7. A rear wall 14b of the slider 14 is also slidable on the pin 6 and is interposed between the base plate 5a of the support body 5 and the rocker arm 7.

As can clearly be seen in FIGS. 4 and 5, the conical helical spring 11 urges the rocker arm 7 and the slider 14 towards the end position in which the chain is engaged with the smallest-diameter sprocket (see also FIG. 3). At the same time, the helical spring 11 urges the rocker arm 7 to rotate about the pin 6 in the sense corresponding to the tensioning of the chain 4.

The rocker arm 7 may be moved towards the positions in which the chain engages the larger-diameter sprockets by means of a metal cable 15 which is slidable in a sheath 16. One end of the cable 15 is anchored at 17 (FIG. 1) to the end wall 14a of the slider 14, whilst one end 16a of the sheath 16 abuts the base plate 5a of the support body 5. The other end 16b of the sheath 16 abuts a stop (not illustrated) welded to the bicycle frame. The metal cable 15 is pulled by means of an operating lever of known type.

The support body 5 is connected to the frame 1 by means of an auxiliary member 18. This member is fixed to the frame 1 at 19, for example by means of a screw, and supports the body 5 for pivoting about an axis 20 parallel to the axis of the hub and spaced forwardly thereof. A helical spring 21 working under torsion is wound around the pin articulating the body 5 to the auxiliary member 18 and has two arms 22 and 23 anchored respectively to the body 5 and to the auxiliary member 18. The spring 21 biases the body 5 towards a position in which the idler wheels 8 and 9 are nearest to the sprockets 2.

FIG. 1 shows the configuration of the device in which the chain 4 is engaged with the smallest-diameter sprocket. When the chain is derailed on to the larger-diameter sprocket by means of the flexible cable 15, the conical helical spring 11, as well as working under torsion and thus pushing the rocker arm 7 in order to keep the chain 4 tensioned, is compressed and can therefore provide for the return movement of the rocker arm towards the smallest-diameter sprocket after the cable 15 has been slackened. During the movement of the rocker arm 7 towards the larger-diameter sprockets, the greater pull exerted by the chain on the rocker arm 7 means that the entire assembly constituted by the support body 5 and the rocker arm pivots about the axis 20 (in an anticlockwise sense with reference to FIG. 1) against the action of the spring 21. Thus, the distance A of the idler wheel 9 from the sprocket which is engaged with the chain at that time, remains substantially constant, ensuring that the derailleur functions correctly and properly. When the chain is derailed from the larger-diameter sprockets on to smaller-diameter sprockets, the spring 21 returns the body 5 towards the position illustrated in FIG. 1.

The presence of the slider 14, on which the end of the metal cable 15 acts, prevents the rotation of the rocker arm 7 and its integral guide arm 13 from causing torsion of the cable.

What is claimed is:

1. A rear derailleur for bicycle gears, which is adapted to derail a bicycle chain on a series of sprockets of increasing diameter carried on a rear hub of a bicycle, said hub having an axis of rotation and said derailleur comprising:

a support body for connection to a bicycle frame;
   a rocker arm mounted on said support body for sliding movement along an axis parallel to said axis of said rear hub between a first end position in which said chain is engaged with the smallest-diameter sprocket and a second end position in which said chain is engaged with the largest-diameter sprocket, said rocker arm also being pivotable about said axis parallel to said rear-hub axis;
   idler wheels for the chain carried by said rocker arm;
   resilient means for urging said rocker arm towards said first position and for urging said rocket arm to pivot about said axis in a sense corresponding to the tensioning of said chain, and
   means for moving said rocker arm towards said second end position, and
   wherein said derailleur further includes an auxiliary member for fixing to said bicycle frame to connect said support body thereto for pivoting about a further axis parallel to said rear hub axis and displaced forwardly of said rear-hub axis, said derailleur also including auxiliary resilient means interposed between said support body and said auxiliary member for urging said support body towards a position in which said idler wheels are nearest said sprocket, and wherein said support body and said rocker arm constitute an assembly which is pivotable relative to said auxiliary member, towards a position in which said idler wheels are further from said sprocket, by the greater pull exerted on said rocker arm by said chain when the latter is derailed onto larger-diameter sprockets.

2. A derailleur as claimed in claim 1, wherein said resilient means are constituted by a conical helical spring interposed between said rocker arm and said support body and working both under torsion and under compression with its turns recessed one within another.

3. A derailleur as claimed in claim 2, wherein said support body includes a base plate and a C-shaped bridge part connected at its ends to the base plate, said auxiliary member is articulated to said base plate and a pin is interposed between said base plate and said C-shaped part and projects laterally from said base plate on the opposite side from C-shaped part, and said rocker arm is slidably and pivotably mounted on said pin.

4. A derailleur as claimed in claim 3, wherein said base plate defines a shaped aperture, a guide arm connected to said rocker arm is slidably and pivotably mounted in said aperture, and the guide arm has an end which is slidable and pivotable on a portion of said pin which is interposed between said base plate and said C-shaped part of said support body.

5. A derailleur as claimed in claim 4, wherein a slider is slidably mounted in said aperture and has first and second ends which are slidable on said pin, said first end being interposed between said C-shaped part of the support body and said guide arm and said second end being interposed between said base plate and said rocker arm.

6. A derailleur as claimed in claim 5, wherein said means for moving said rocker arm towards said second end position comprise a flexible metal cable connected to one end of said slider and at another end to a control lever, and a sheath having a first end in abutment with said base plate support body and a second end for abutment with a stop connected to said frame.

* * * * *